July 15, 1969    J. A. WARREN    3,456,133
PHASE CONTROL FIRING CIRCUIT
Filed Sept. 6, 1966    3 Sheets-Sheet 1

INVENTOR.
JAMES A. WARREN
BY
Shanley & O'Neil
ATTORNEYS

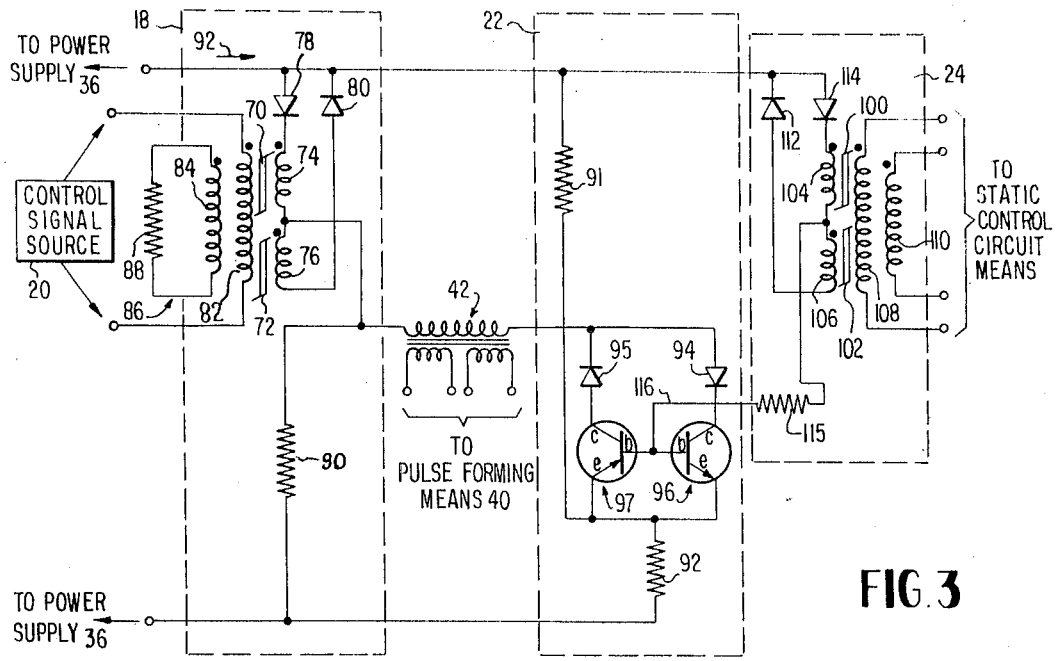
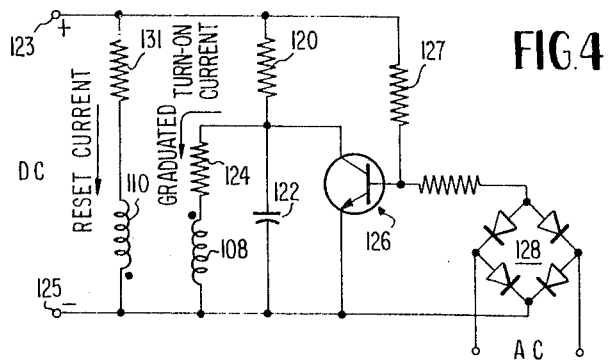
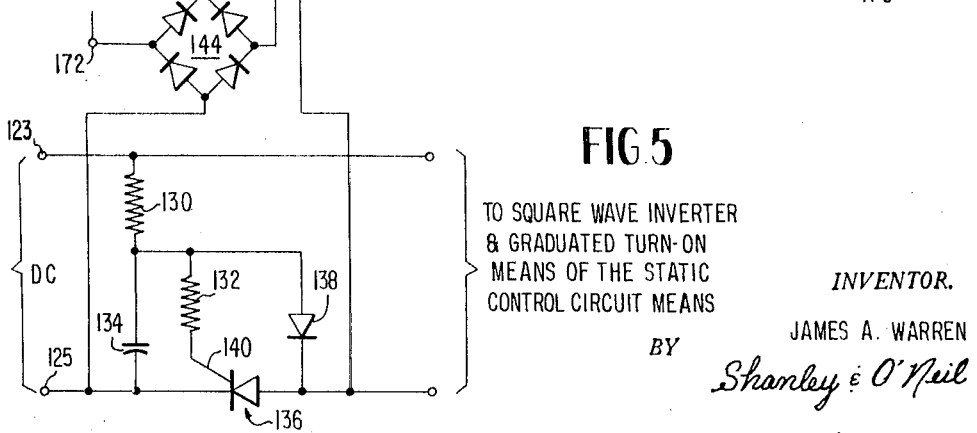
FIG.5 TO SQUARE WAVE INVERTER & GRADUATED TURN-ON MEANS OF THE STATIC CONTROL CIRCUIT MEANS
INVENTOR.
JAMES A. WARREN
BY
Shanley & O'Neil
ATTORNEYS July 15, 1969 J. A. WARREN 3,456,133
PHASE CONTROL FIRING CIRCUIT
Filed Sept. 6, 1966 3 Sheets-Sheet 3

INVENTOR.
JAMES A. WARREN
BY Shanley & O'Neil
ATTORNEYS

United States Patent Office 3,456,133
Patented July 15, 1969

3,456,133
PHASE CONTROL FIRING CIRCUIT
James A. Warren, Butler, Pa., assignor to Magnetics, Inc., a corporation of Pennsylvania
Filed Sept. 6, 1966, Ser. No. 577,347
Int. Cl. H03k 23/08
U.S. Cl. 307—305   12 Claims This invention is concerned with phase control firing circuitry and, more specifically, with firing circuits for phase control devices for proportioning power to transformer connected loads.

Phase control devices, such as silicon controlled rectifiers, are used to proportion power to transformers in many applications. Such semiconductor devices which have thyratron characteristics are referred to as thyristors. They require some type of protection to prevent damage when large surge currents occur in transformer supply circuits. For example, inrush currents as high as 30 times rated current can exist when a transformer saturates.

While magnetic amplifiers are inherently well suited to operations involving phase control of thyristors, they do not inherently help with "turn-on" problems present with transformer-connected loads and can add to these problems by their own "turn-on" or firing characteristics.

Considering likelihood of transformer saturation during turn-on, residual flux density of the transformer core can be determinant and a 50–50 chance of transformer saturation exists dependent on the phase relationship between AC power delivered to the transformer and the residual flux density of the transformer core. For example, when AC power supply is turned "off" or interrupted during a positive half cycle, the flux in the transformer core will decay to a retentive flux density level $+B_r$. If AC power is turned on again during a positive half cycle, the transformer will saturate if no special measures have been taken to prevent saturation.

In addition typical magnetic amplifiers, having a so-called "hard-start" characteristic, increase chances of transformer saturation and it is possible to saturate a transformer core regardless of the phase relationship between the AC power supply and the residual flux density of the transformer core. Also presence of a gating signal on a phase control device, such as an SCR, at the time AC power is turned on, or close to turn-on of AC power, further increases the likelihood of transformer saturation. These are problems of longstanding which are well known to those skilled in the art.

Some prior solutions to these problems include oversizing a transformer for a particular application so that saturation will not occur regardless of the above-mentioned phasing relationship, or oversizing a thyristor for a particular application, that is using a thyristor much below its rated capacity so as to avoid damage to the thyristor by transformer inrush current. Neither of these approaches, however, provides an economic solution to the above problems.

Fast acting fuses can also be used to protect thyristors, however frequent fuse clearing is annoying and is, in itself, an uneconomic solution. Line impedances can also be inserted but they place restrictions on the type of load which can be handled by a transformer and decrease efficiency of the circuit.

It is an object of the present invention to provide magnetic amplifier firing circuit means which operate to prevent transformer saturation under all conditions when its AC power source is energized without relying on uneconomic solutions of the prior art mentioned above. The invention provides slow start features controlling initial output of a firing circuit when a turn-on signal is present, and provides control of gating pulses to phase control means from zero to a desired "on" condition over a predetermined number of cycles of the AC power supply. Coupled with these protection features of the present invention is a fast recovery time for the firing circuit which in one embodiment makes protection immediately available even after short interruptions, a half cycle or less, in power supply.

Referring to the accompanying drawings:

FIGURE 3 is a schematic circuit diagram of a portion of FIGURE 1 showing magnetic amplifier and relay means forming part of the firing circuit of the present invention;

FIGURE 4 is a schematic circuit diagram of a portion of FIGURE 1 showing static control means forming part of the firing circuit of the present invention;

FIGURE 5 is a schematic circuit diagram of a portion of FIGURE 1 showing time delay means forming part of the present invention;

Figure 1:
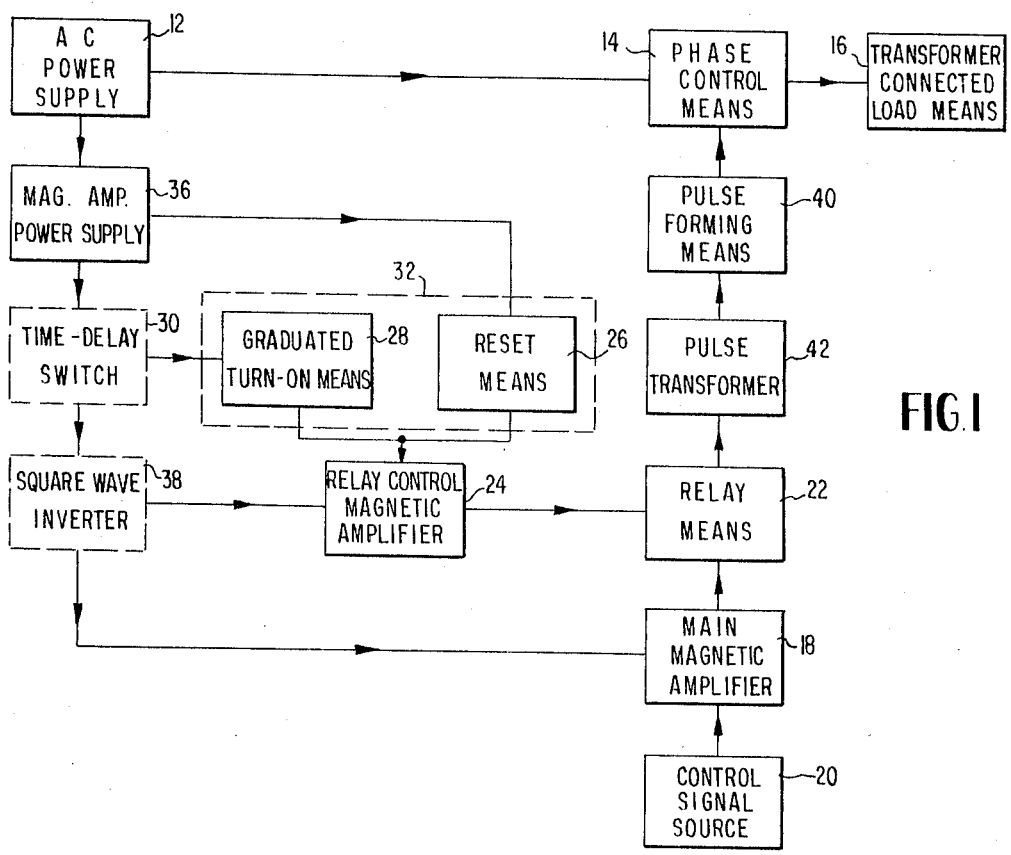
FIGURE 1 is a block diagram showing firing circuit means of the present invention between an AC power supply and a transformer connected load.

Referring to FIGURE 1, AC power supply 12 is connected through phase control means 14 to transformer-connected load means 16. Phase control means 14 is gated by a main magnetic amplifier means 18 to proportion power to the transformer connected load means 16 as desired. That is firing of main magnetic amplifier 18 produces signals in phase with AC power supply 12 for time angle gating of phase control means 14. Control signal source 20 provides a signal for controlling firing of main magnetic amplifier 18 from a source external to the firing circuit.

To carry out the objects of the invention and avoid transformer saturation under all circumstances, the present invention provides the following:

| | |
|---|---|
| Condition A:<br>AC power turn-on, no input signal. | Control<br>No gating signal delivered to thyristor means. No power delivered to the load. |
| Condition B:<br>AC power turn-on, input signal on. | No gating signal delivered initially to phase control means and slow phasing of gating signal causing slow phasing of power delivered to transformer to enable transformation through minor loops, thus avoiding saturation of the transformer. |
| Condition C:<br>AC power interrupted, input signal on. | Same results as Condition B above, plus rapid recovery including provision for immediate protection after short interval power interruptions. |
| Condition D:<br>AC power on, input signal interrupted. | Gradual "turn-off" of power to load and gradual "turn-on" upon return of input signal. |

FIGURE 1 will be referred to for the purpose of describing the interaction of the various components combined by the present invention to bring about the above control. In the phase control firing circuit of the present invention, a gating signal from main magnetic amplifier means 18 must be delivered through relay means 22. Relay control magnetic amplifier means 24 controls switching of relay means 22 and, in a unique manner to be described in detail later, provides slow phasing of the gating signal.

Reset means 26 resets flux level in the saturable cores of relay control magnetic amplifier 24 to rapidly return the slow phasing function to the firing circuit after an interruption of power from AC source 12. Time intervals required for resetting flux level in saturable cores may be too long for many applications; therefore, the present invention also makes provision for short interruption of the AC power, half cycle or less, through time delay switch means 30. Utilizing this concept, transformer inrush protection is continuously available and, in effect, no recovery time is required before the firing circuit of the present invention is prepared to render the protection spelled out above.

The slow phasing of power from zero to desired "on" level provided by the present invention permits transformation of power through the minor loops of the load transformer core and avoids saturation of the core regardless of residual flux density in the core from previous operation of the circuit or the relative phase of the AC power source 12 when power is returned.

Slow phasing control of relay control magnetic amplifier 24 is obtained through graduated turn-on means 28 which in combination with reset means 26 forms static control means 32 for relay control magnetic amplifier 24. The term "static control" is used in the sense that control of relay control magnetic amplifier 24 cannot be changed by external signal and its operation is independent of main magnetic amplifier 18.

Providing power for both magnetic amplifiers from AC source 12 avoids phase synchronization problems and can be accomplished through magnetic amplifier power supply means 36. Square wave AC power to the magnetic amplifiers is preferred and is provided by square wave inverter 38. Pulse forming means 40 provides optimum shaping of a firing pulse and pulse transformer 42 serves as an isolation transformer.

In a typical application of the invention, the load could be a heating element in a heat treating furnace with thyristor means proportioning power to maintain desired temperature level. A thermal sensor in the furnace would provide an external signal for the firing circuit and the main magnetic amplifier would function to amplify the external signal and provide desired phase angle conduction of the thyristor means.

Figure 2:
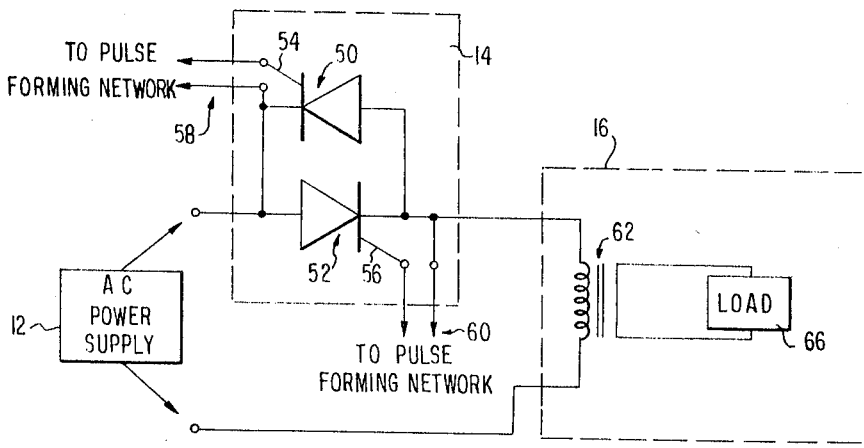
FIGURE 2 is a schematic circuit diagram of a portion of FIGURE 1 showing phase control means in line between an AC source and load.

Connection of a phase control means between an AC power source and a load is shown in FIGURE 2. Phase control means 14 includes thyristors 50 and 52 with gating terminals 54 and 56 and gating connector means 58 and 60. Thyristors 50 and 52 are poled to conduct in alternate half cycles of AC power supply 12, as shown. Transformer-connected load means 16 includes transformer 62 and load 66. The embodiment shown is a full wave, single phase application; however, the teachings of the invention can readily be applied to multiphase operations.

Referring to FIGURE 3, magnetic amplifier 18 and relay control amplifier 24 may be conventional self-saturating magnetic amplifiers. Main magnetic amplifier 18 includes saturable cores 70 and 72 coupled by power windings 74 and 76, respectively, with diodes 78 and 80 poled as shown. Also coupled to saturable cores 70 and 72 are control winding 82, connected to control signal source 20, and dampening winding 84, connected in the closed dampening circuit 86 which includes dampening resistor 88. Diodes 78 and 80 provide for unidirectional flow in each half cycle through power windings 74 and 76 respectively. Dampening circuit 86 functions in a manner well known in the art to provide gradual "turn-on" "turn-off" characteristics.

The primary winding of pulse transformer means 42 is connected between main magnetic amplifier 18 and relay means 22. Magnetic amplifier load resistor 90 provides a load for the main magnetic amplifier 18 when power is on to the magnetic amplifier and no gating signal is being removed through the pulse transformer means 42 and the relay means 22.

Relay control magnetic amplifier 24 includes saturable cores 100, 102 coupled by power windings 104, 106, respectively, and static control windings 108 and 110. Diodes 112 and 114 provide for unidirectional flow through power windings 106 and 104, respectively. AC in the power windings 104, 106 is in phase with AC power supply 12.

Assuming a positive half cycle of the AC power supply 12, arrow 92 indicates direction of current when an input signal on winding 82 fires main magnetic amplifier 18. Diode 94 of relay means 22 is poled forward but, prior to firing of relay control magnetic amplifier 24, transistor 96 is biased off by negative bias as determined by the relationship of resistors 91 and 92, so that no gating signal is delivered.

Upon firing of relay control magnetic amplifier 24, during a positive cycle of the AC power supply 12, a firing signal for relay means 22 is delivered over connector 116 to transistor 96. Transistor 96 is switched "on" and a gating signal from main magnetic amplifier 18 is delivered by secondary winding means of pulse transformer 42 through pulse forming means 40 to gating connector means 60 of thyristor 52.

It should be noted that a gating signal for phase control means 14 will not be delivered until both magnetic amplifiers have fired. Firing of the magnetic amplifiers is controlled to obtain the desired delay and slow phasing mentioned earlier.

One prerequisite to avoid transformer saturation taught by the present invention is that there be no initial output when AC power is turned on, with or without an external signal calling for power to the transformer-connected load means, and if there is an input signal calling for power, the output should come on in a slow fashion. This is accomplished by proper selection of circuit values for static control means 32. Static control means 32 provides for predetermined control of relay control magnetic amplifier, independent of main magnetic amplifier 18. Predetermined control includes resetting to "off" condition so that there is no initial output when AC power is turned on and slow phasing from an "off" condition to the desired "on" condition. Static control means 32 also provides for rapid recovery of the firing circuit. Ordinarily slow phasing over a time period in the range of 2 to 5 cycles is sufficient to provide transformer inrush protection. In addition, the gradual "turn-on" and "turn-off" characteristics of main magnetic amplifier 18 provided by dampening circuit 86 provides protection in the event of an interruption of the external signal while AC power remains "on."

Referring to FIGURE 4, slow phasing is accomplished by development of graduated turn-on current, i.e., slow-rise current, in control winding 108 of relay control magnetic amplifier 18. Resistor 120 connected in series with capacitor 122, and resistor 124 connected in parallel with capacitor 122, form an RC network connected to DC supply through terminals 123, 125 of magnetic amplifier power supply 36. Prior to full charging of capacitor 122, turn-on current in winding 108 gradually increases, thus providing, through circuit means previously described, graduated phase control of power to the transformer-connected load means 18 from zero to the desired level. An LR (inductor-resistor) circuit can be substituted for the RC network and serve the same function.

When an RC network is used, transistor 126 is connected across capacitor 122. Transistor 126 is held "off" by bridge rectifier 128. When AC power is interrupted, transistor 126 is switched "on" and discharges capacitor 122. Flux level in saturable cores 100 and 102 of relay control magnetic amplifier 24 is also reset upon interruption of AC power by discharge of the filter capacitor in the power supply circuit 36 which delivers reset current to winding 110. Recovery time for this circuit, that is, time required before power returns for the circuit to provide protection through reset control alone, is about .2 second. When faster recovery times are required, time delay switch 30 is utilized in the circuit.

Time delay switch 30 functions in a unique manner to provide instantaneous recovery time for the firing circuit by delaying delivery of AC power to relay control magnetic amplifier 24. It also provides for delay in power to graduated turn-on means 28. It can also provide for delay in power to the main magnetic amplifier 18, as shown, but this is not required in order to provide the desired protection.

Referring to FIGURE 5, an RC network including resistors 130, 132 and capacitor 134 is connected to DC supply terminals 123, 125 of magnetic amplifier power supply 36. SCR 136 blocks current in the line when power comes "on." Capacitor 134 is charged from the DC power supply and, after charging, discharges to fire SCR 136. The circuit through diode 138 then conducts current and terminal 140 of SCR 136 is by-passed. This delay, provided by the RC network, can also be provided by an LR circuit in which an inductor is substituted for capacitor 134.

After firing of SCR 136 by discharge of capacitor 134, it is desired to maintain SCR 136 in an "on" condition and prevent recharging of capacitor 134 while AC power remains "on." The DC power supply from magnetic amplifier power supply means 36 is made up of unidirectional pulses which return to zero each half cycle and cannot maintain conduction in SCR 136. Phase shift network 142 is provided to solve this problem as described immediately below.

Figure 6:
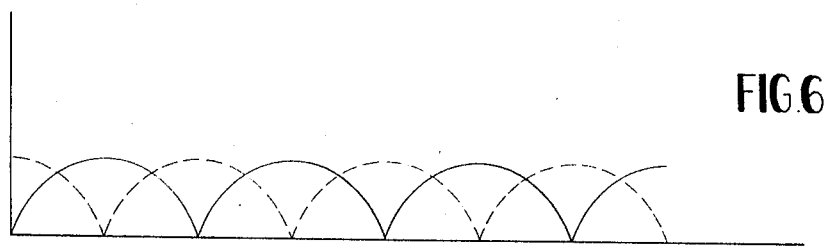
FIGURES 6 and 7 show current wave forms existing in a part of the circuit of the present invention.
Figure 7:
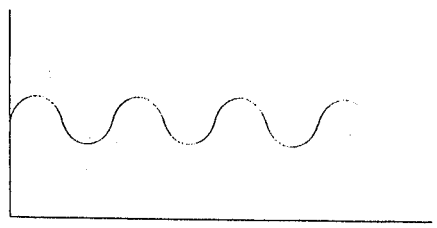

Unidirectional pulses forming the DC supply from magnetic amplifier power supply 36 are shown in solid lines in FIGURE 6. Phase shift network 142 is connected to the AC supply by means of bridge rectifier 144, resistor 143, and capacitor 145 and provides unidirectional pulses which are shifted 90 degrees from the DC supply pulses at terminals 123, 125. The shifted pulses are shown in dotted lines in FIGURE 6. These unidirectional pulses are added algebraically as shown in FIGURE 7, which illustrates the DC supply seen by SCR 136. The phase shift network can also suitably employ an inductor in place of capacitor 134.

With power supply as shown in FIGURE 6, SCR 136 remains in an "on" condition after initial firing and capacitor 134 remains in a discharged state until power is interrupted. When power is interrupted, SCR 136 immediately stops conducting. Power can return immediately after an interruption but capacitor 134 must be recharged before SCR 136 will shift to an "on" condition. This introduces a preselected delay and provides instantaneous recovery time for the protection provided by the firing circuit of the present invention. The delay provided by the RC network is selected to permit resetting of flux level insaturable cores 100, 102 of relay control magnetic amplifier 24. Resetting of the flux level in these cores takes place when power comes on—before discharge of capacitor 134.

Figure 8:
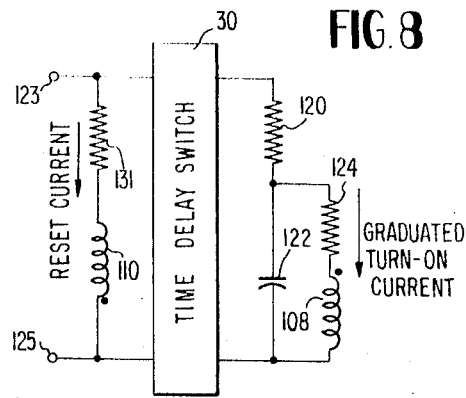
FIGURE 8 is a schematic circuit diagram showing an alternate embodiment with time delay switch means connected in the firing circuit of the present invention.

As will be evident from a comparison of FIGURES 4 and 8, when the time delay switch 30 is connected in circuit, transistor 126 used for discharging capacitor 122, and resistors 127, 129 and bridge rectifier 128 are not required and power from the power supply means 38 resets the cores of the relay control magnetic amplifier 24.

Figure 9:
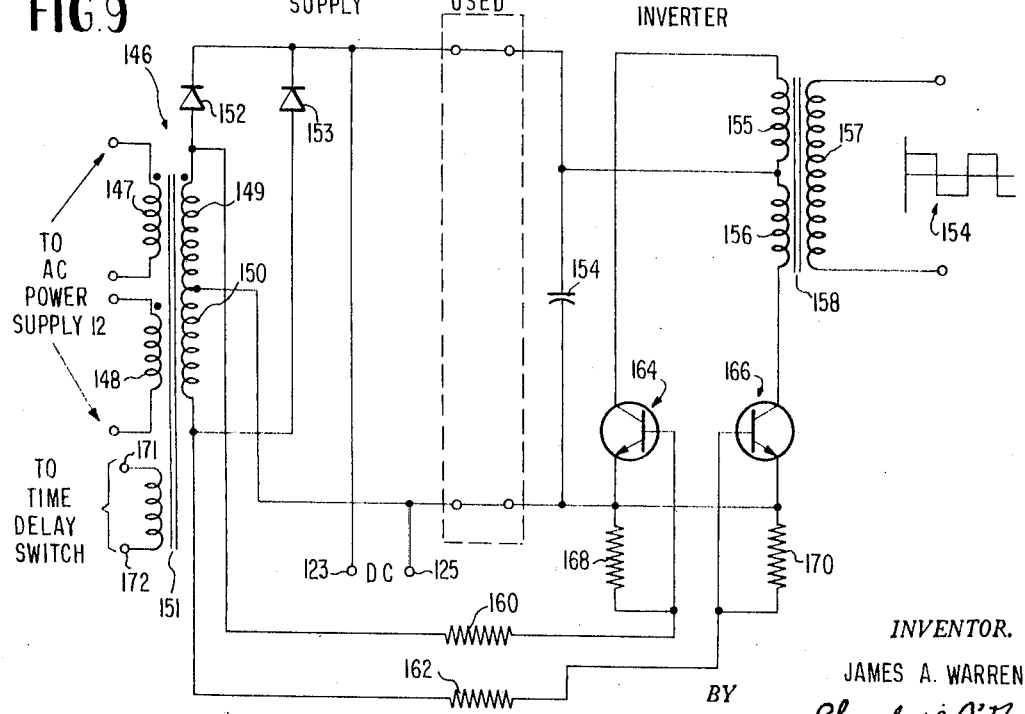
FIGURE 9 is a schematic circuit diagram showing power supply means for the firing circuit of the present invention.

Referring to FIGURE 9, a conventional center-tapped rectifier 146, including primary windings 147, 148 and secondary windings 149, 150 coupled to transformer core 151 and, further including diodes 152, 153, provides DC supply from the AC power source 12. While the power windings on the magnetic amplifier can operate on sinusoidal AC, an in phase square wave input as shown at 154 is preferred since the gating signal from the main magnetic amplifier 18 is not decreased in the latter portions of a half cycle when a square wave input is used.

Square wave inverter 38 may be of conventional design. Windings 155, 156 and 157 are coupled to transformer core 158. Capacitor 159 functions as a filter capacitor. Resistors 168 and 170 are for the purpose of limiting reverse voltage on the base-emitter junctions of inverter transistors 164 and 166, and resistors 160, 162 provide bias.

To review operation of the firing circuit of the present invention briefly, main magnetic amplifier 18 must be fired in response to an input signal from control signal source 20 to provide a gating pulse for phase control means 14 and relay means 22 must be fired by relay control magnetic amplifier before the gating signal can be delivered to phase control means 14. Both magnetic amplifiers are fired in phase with AC power supply 12 so that the gating signals is in phase with the power to be proportioned by phase control means 14. The relay control magnetic amplifier 24 is reset by reset means 26 so that no gating signal is delivered initially. Relay control magnetic amplifier 24 is controlled by graduated turn-on means 28 to provide preselected slow phasing independently of an external signal. Recovery time for the firing circuit is controlled by the reset means 26 and graduated turn-on means 28 or time delay switch 30.

Pulse forming means 40 shapes the gating signals as required for optimum gating of phase control means 14. Steep rise, high peak, and sufficient duration and power are desired when gating thyristors 50 and 52. Pulse forming means 40 can be of conventional design.

In a specific embodiment of the persent invention, AC power supply 12 can be 120/240 volt, 60 cycle source. Transformer 62 can have a volt-amp rating as determined by requirements of the load. Thyristors 50 and 52 can be similarly matched to the load providing the most economic transformer and thyristor selections. Typical circuit values for firing circuit of the invention are:

Magnetic amplifiers:
   Cores 70, 72, 100, 102 _____ Square Permalloy 80 (52026—2D Magnetics, Inc.).
   Power windings 74, 76, 104, 106 _____ 1700 turns each.
   Control winding 82 _____ 100 turns.
   Dampening winding 84 _____ 100 turns.
   Dampening resistor 88 _____ 100 ohms.
   Diodes 78, 80, 112, 114 _____ IN 537.
   Graduated turn-on winding 108 _____ 200 turns.
   Reset winding _____ 100 turns.
   Resistor 90 _____ 220 ohms.
   Resistor 115 _____ 1000 ohms.
Relay Means:
   Transistor 96 _____ NPN, 2N697.
   Transistor 97 _____ PNP, 2N652.
   Diodes 94, 95 _____ IN537.
   Negative bias resistor 98 _____ 100 ohms.
   Resistor 91 _____ 1000 ohms.
Static control means:
   Capacitor 122 _____ 100 mf. (15 v.).
   Resistor 124 _____ 2.2K.
   Resistor 120 _____ 2.2K.
   Transistor 126 _____ NPN, 2N697.
   Resistor 127 _____ 3.9K.
   Resistor 129 _____ 1K.
   Resistor 131 _____ 5.6K.
   Bridge rectifier 128, diodes _____ IN537.
Time delay switch:
   Capacitor 135 _____ 25 mf. (25 v.).
   SCR 136 _____ G. E. C–U.
   Resistors 130, 132 _____ 100K each.
   Diode 138 _____ IN537.
   Bridge rectifier 144, diodes _____ IN537.
   Resistor 143 _____ 10 ohms.
   Capacitor 145 _____ 5 mf.
Power supply and square wave inverter:
   Transformer core 151 _____ Silicon iron (54040–12K, Magnetics, Inc.).
   Windings 147, 148 _____ 2400 turns each.

Magnetic amplifiers:
  Windings 149, 150 _____ 265 turns each.
  Time delay switch winding ___ 265 turns.
  Diodes 152, 153 _____ IN537.
  Capacitor 154 _____ 500 mf. (25 v.).
  Transistor 164, 166 _____ NPN, 2N697.
  Resistors 168, 170 _____ 330 ohms, each.
  Resistors 160, 162 _____ 3.9K, each.
  Transformer core 158 _____ Silicon iron (54038–4K, Magnetics, Inc.).
  Winding 155, 156, 157 _____ 655 turns each.

What is claimed is:

1. Phase control firing circuit comprising:
  means for connecting phase control means to an AC load power source,
  main magnetic amplifier means for producing a gating signal for the phase control means, the main magnetic amplifier means including winding means for receiving an external signal for firing the main magnetic amplifier means,
  terminal means for connecting the phase control means to receive the gating signal,
  relay means for controlling delivery of the gating signal to the terminal means,
  relay control magnetic amplifier means connected to the relay means to control switching of the relay means between "off" and "on" conditions, the relay control magnetic amplifier means including control winding means, and
  means for predetermined control of firing of the relay control magnetic amplifier means independently of the main magnetic amplifier means to provide phase graduated switching of the firing circuit from an "off" to a desired "on" condition.

2. The phase control firing circuit of claim 1 further including:
  means for dampening firing of the main magnetic amplifier means 3. The phase control firing circuit of claim 1 further including:
  power supply means for the main magnetic amplifier means and the relay control magnetic amplifier means, and
  means for connecting the power supply means to receive power from the AC load power source;
  the power supply means including:
    means for delivering AC to power winding means of the main magnetic amplifier means and the relay control magnetic amplifier means, and
    means for providing DC to the means for predetermined control of the relay control magnetic amplifier means.

4. The phase control firing circuit of claim 3 further including:
  square wave generating means for controllably delivering a square wave configuration AC input to power winding means of the main magnetic amplifier means.

5. The phase control firing circuit of claim 3 in which the means for predetermined control of firing of the relay control magnetic amplifier means includes:
  means connected between the power supply means and the control winding means of the relay control magnetic amplifier means for providing slow-rise DC in the control winding means of the relay control magnetic amplifier means over a predetermined number of cycles of the AC load power source during transition of the relay control magnetic amplifier means from a full "off" condition to a desired "on'" condition.

6. The phase control firing circuit of claim 5 in which:
  the relay control magnetic amplifier means includes flux level reset winding means, and
  the means for predetermined control of firing of the relay control magnetic amplifier means includes means for supplying DC to the flux level reset winding means of the relay control magnetic amplifier means.

7. The phase control firing circuit of claim 3 further including:
  time delay switch means for automatically delaying delivery of AC to the power winding means to the relay control amplifier means for a predetermined number of cycles of the AC load power source prior to transition of the firing circuit from "off" condition to desired "on" condition.

8. The phase control firing circuit of claim 1 in which the relay means includes transistor means having collector means connected to power winding means of the main magnetic amplifier means and base means connected to power winding means of the relay control magnetic amplifier means.

9. Phase control circuit comprising:
  thyristor means for connecting load means to an AC load power source, the thyristor means including gating terminal means,
  main magnetic amplifier means for producing a gating signal for the thyristor means, the main magnetic amplifier means including winding means for receiving an external signal for controlling firing of the main magnetic amplifier means,
  relay means connected between the main magnetic amplifier means and the gating terminal means of the thyristor means for controlling delivery of the gating signal from the main magnetic amplifier means to the gating terminal means of the thyristor means,
  relay control magnetic amplifier means connected to the relay means to control switching of the relay means between "off" and "on" conditions, the relay control magnetic amplifier means including control winding means, and
  means for predetermined controlled firing of the relay control magnetic amplifier means independently of the main magnetic amplifier to provide phase graduated switching of the phase control circuit from an "off" to a desired "on" condition.

10. In combination:
  an AC load power source,
  transformer means for connecting a load to the AC load power source,
  thyristor means connected between the AC load power source and the transformer means for proportioning power from the AC load power source to the load, the thyristor means including gating terminal means,
  main magnetic amplifier means for producing a gating signal for the thyristor means, the main magnetic amplifier means including winding means for receiving an external signal for controlling firing of the main magnetic amplifier means,
  relay means connected between the main magnetic amplifier means and the gating terminal means of the thyristor means for controlling delivery of the gating signal from the main magnetic amplifier means to the gating terminal means of the thyristor means,
  relay control magnetic amplifier means connected to the relay means to control switching of the relay means in phased relationship with the AC loal power source,
  power supply means for providing power to the main magnetic amplifier means an dthe relay control magnetic amplifier means from the AC load power source, and
  static control means for predetermined control of firing of the relay control magnetic amplifier means independently of the main magnetic amplifier,
    the static control means including:
      means for providing phase graduated firing of the relay control magnetic amplifier means from an "off" condition to a desired "on" condition, and means for resetting flux level in saturable cores of the relay control magnetic amplifier means prior to firing of the relay control magnetic amplifier after an interruption in power supply from the AC load power source.

11. The combination of claim 10 further including time delay switch means for automatically delaying power delivery to the relay control magnetic amplifier for a predetermined number of cycles after an interruption of power supply from the AC load power source.

12. The combination of claim 10 further including dampening means for the main magnetic amplifier for delaying delivery of power to the load for a predetermined number of cycles of the AC load power source after an interruption of the external signal to the main magnetic amplifier.

References Cited

UNITED STATES PATENTS 3,391,332   7/1968   Funfstuck _____ 323—24 X

ROY LAKE, Primary Examiner

J. B. MULLINS, Assistant Examiner

U.S. Cl. X.R.

315—196; 323—24